(12) United States Patent
Penn

(10) Patent No.: US 6,824,275 B2
(45) Date of Patent: Nov. 30, 2004

(54) FOLDED PROJECTION LENS

(75) Inventor: Steven M. Penn, Plano, TX (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 10/335,455

(22) Filed: Dec. 31, 2002

(65) Prior Publication Data

US 2003/0123029 A1 Jul. 3, 2003

Related U.S. Application Data

(60) Provisional application No. 60/344,897, filed on Dec. 31, 2001.

(51) Int. Cl.[7] .................. G03B 21/28; G03B 21/26; G03B 21/20
(52) U.S. Cl. .................. 353/81; 353/30; 353/33; 353/98
(58) Field of Search .................. 353/20, 28, 69, 353/70, 74–78, 99, 122, 30–34, 81, 97, 98; 349/5, 7–10

(56) References Cited

U.S. PATENT DOCUMENTS

| | | | | |
|---|---|---|---|---|
| 5,604,624 A | * | 2/1997 | Magarill | 359/224 |
| 6,560,048 B1 | * | 5/2003 | Okamori et al. | 359/833 |
| 6,609,798 B1 | * | 8/2003 | Milinusic et al. | 353/98 |
| 6,619,804 B2 | * | 9/2003 | Davis et al. | 353/98 |
| 2002/0158210 A1 | * | 10/2002 | Suzuki | 250/455.11 |
| 2003/0035109 A1 | * | 2/2003 | Hartwich et al. | 356/435 |
| 2003/0202259 A1 | * | 10/2003 | Nishimae et al. | 359/726 |

* cited by examiner

*Primary Examiner*—David Gray
*Assistant Examiner*—Andrew Sever
(74) *Attorney, Agent, or Firm*—Charles A. Brill; Wade James Brady, III; Frederick J. Telecky, Jr.

(57) ABSTRACT

A projection lens that uses a TIR surface as both an angular filter and fold mirror. A first lens element 602 is placed very close to the TIR prism assembly 604. Because the lens is so close, it gathers both off state and state light from the modulator. Off state light from the DMD follows path 606 while on state light follows path 608. A total internal reflection surface 610 receives both the on state and the off state light. Because the off state light strikes the TIR surface at an angle less than the Brewster's angle, the off state light passes through the TIR prism and is removed from the projection path. The on state light strikes the TIR surface at an angle greater than Brewster's angle and is reflected by the TIR surface through the remaining projection lens components.

8 Claims, 4 Drawing Sheets

US 6,824,275 B2

FOLDED PROJECTION LENS

This application claims priority under 35 USC §119(e)(1) of provisional application No. 60/344,897 filed Dec. 31, 2001.

FIELD OF THE INVENTION

This invention relates to the field of display systems, particularly to micromirror display systems, more particularly to projection lens systems for micromirror projection display systems.

BACKGROUND OF THE INVENTION

Micromirror devices are the heart of some of today's most popular projection display devices. Until now, most micromirror projectors are front projection displays in which the projector and the viewer are on the same side of the display screen. As micromirror-based projectors migrate from businesses and conference rooms to homes, the demand for rear projection displays will increase.

Rear projection displays are often better suited for home use since the rear projection provides an image that is easier to see in an illuminated room. Rear projection images also are not blocked by people and other objects passing between the projector and the display screen. Furthermore, rear projection displays do not require a convenient location on which to place or from which to suspend the projector.

While there are many advantages to rear projection micromirror displays, there are also challenges. One challenge is devising an optical systems for the rear projection displays. What is needed is a lens system that is compact enough to easily be enclosed in a rear projection display case while being inexpensive to produce and able to produce exceptionally clear images.

SUMMARY OF THE INVENTION

Objects and advantages will be obvious, and will in part appear hereinafter and will be accomplished by the present invention that provides an optical system and method that enables rear projection micromirror based displays.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF THE PREFERRED EMBODIMENTS

Figure 1:
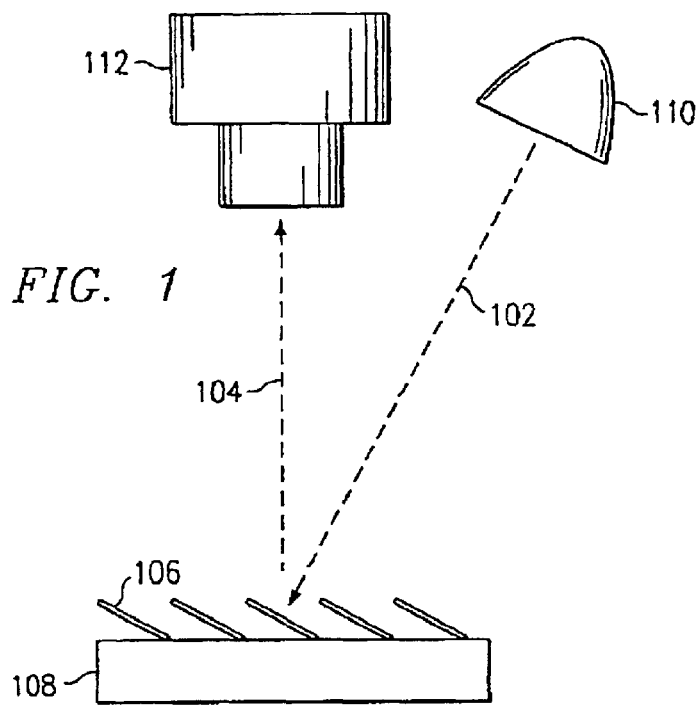
FIG. 1 is a side view of basic illumination and projection optical paths in a micromirror projection display showing the mirrors in the array rotated to an "on" position.

The present invention provides a novel projection lens and display system. The projection lens and display system enable a compact rear projection display system. According to one embodiment of the present invention, a projection lens is provided. The projection lens comprising: a first lens element for receiving a beam of light traveling along a light path from a micromirror array; an aperture stop for blocking off state light passing through the first lens; a fold mirror positioned on the light path to receive light from the first lens and direct the light along a second path; at least one additional lens on the second path operable to focus light traveling along the second path onto an image plane.

According to another embodiment of the present inventions, a projection lens is provided. The projection lens comprising: a first lens element for receiving a beam of light traveling along a light path from a micromirror array; a total internal reflection surface positioned on the light path to receive light from the first lens and reflect on state light along a second path while not reflecting off state light along the second path; at least one additional lens on the second path operable to focus light traveling along the second path onto an image plane.

According to yet another embodiment of the present invention, a projection lens is provided. The projection lens comprising: a first lens element for receiving a beam of light traveling along a light path from a micromirror array; a total internal reflection prism positioned on the light path to receive light from the first lens and reflect on state light along a second path while not reflecting off state light along the second path; at least one additional lens on the second path operable to focus light traveling along the second path onto an image plane.

According to another embodiment of the present invention, a display system is provided. The display system comprising: a light source for providing a light beam along an illumination path; a micromirror array on the illumination path, the micromirror operable to selectively reflect portions of the light beam along a projection path, the portions comprising on state reflections and off state reflections; and a projection lens system. The projection lens system comprising: a first lens element for receiving the selectively reflected a beam of light traveling along the projection path; an aperture stop for blocking off state light passing through the first lens; a fold mirror positioned on the light path to receive light from the first lens and direct the light along a second path; and at least one additional lens on the second path operable to focus light traveling along the second path onto an image plane.

According to another embodiment of the present invention, a display system is provided. The display system comprising: a light source for providing a light beam along an illumination path; a micromirror array on the illumination path, the micromirror operable to selectively reflect portions of the light beam along a projection path, the portions comprising on state reflections and off state reflections; and a projection lens system. The projection lens system comprising: a first lens element for receiving the selectively reflected a beam of light traveling along the projection path; an aperture stop for blocking off state light passing through the first lens; a total internal reflection surface positioned on the light path to receive light from the first lens and reflect on state light along a second path while not reflecting off state light along the second path; and at least one additional lens on the second path operable to focus light traveling along the second path onto an image plane.

According to another embodiment of the present invention, a display system is provided. The display system comprising: a light source for providing a light beam along an illumination path; a micromirror array on the illumination path, the micromirror operable to selectively reflect portions of the light beam along a projection path, the portions comprising on state reflections and off state reflections; and a projection lens system. The projection lens system comprising: a first lens element for receiving the selectively reflected a beam of light traveling along the projection path; an aperture stop for blocking off state light passing through the first lens; a total internal reflection prism positioned on the light path to receive light from the first lens and reflect on state light along a second path while not reflecting off state light along the second path; and at least one additional lens on the second path operable to focus light traveling along the second path onto an image plane.

Alternate embodiments include multiple lens elements in the light path from the micromirror. The aperture is located on either side of the lens elements, or within the lens elements. In some embodiments, the total internal reflection surface fails to reflect flat-state light—light from undeflected mirrors or other structure that are generally parallel to the mirror array. The fold mirror has optical power in some embodiments, and is concave or convex is some embodiments.

FIG. 1 is a side view of basic illumination 102 and projection 104 optical paths in a micromirror projection display showing the mirrors 106 in the array 108 rotated to an "on" position. Light from a light source 110 is focused onto the mirror array 108. When the mirrors 106 are rotated toward the light source, as shown in FIG. 1, the light reflected by the mirrors 106 travels perpendicular to the plane of the array 108 and enters the projection lens 112. The projection lens 112 focuses the light from the mirrors in the on position onto an image plane. A bright pixel or spot appears on the image plane corresponding to every pixel in the on position.

Figure 2:
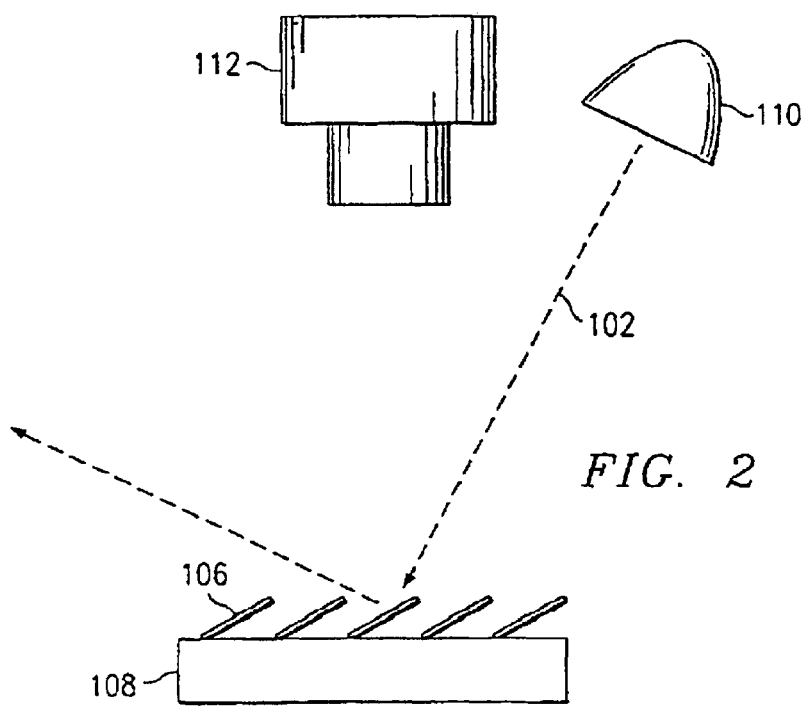
FIG. 2 is a side view of basic illumination and projection optical paths in a micromirror projection display showing the mirrors in the array rotated to an "off" position.

FIG. 2 is a side view of basic illumination 102 and projection 104 optical paths in a micromirror projection display showing the mirrors 106 in the array 108 rotated to an "off" position. Light from a light source 110 is focused onto the mirror array 108. When the mirrors 106 are rotated away from the light source, as shown in FIG. 2, the light reflected by the mirrors 106 travels along a path that does not lead to the projection lens 112. When light from a mirror does not enter the projection lens 112, the pixel on the image plane corresponding to the mirror remains dark.

The typical micromirror device rotates 10° in either the on or off directions. For a 10° mirror rotation, the light source is positioned 20° away from array normal, resulting in a 20° separation between the illumination light beam 102 and the projection light beam 104. With only a 20° separation between the light source and any optical components in the illumination path and the projection lens in the projection path, it is very difficult to prevent mechanical interference between the parts. One solution is to use a total internal reflection (TIR) prism in the illumination and projection paths to increase the separation between the illumination and projection paths.

Figure 3:
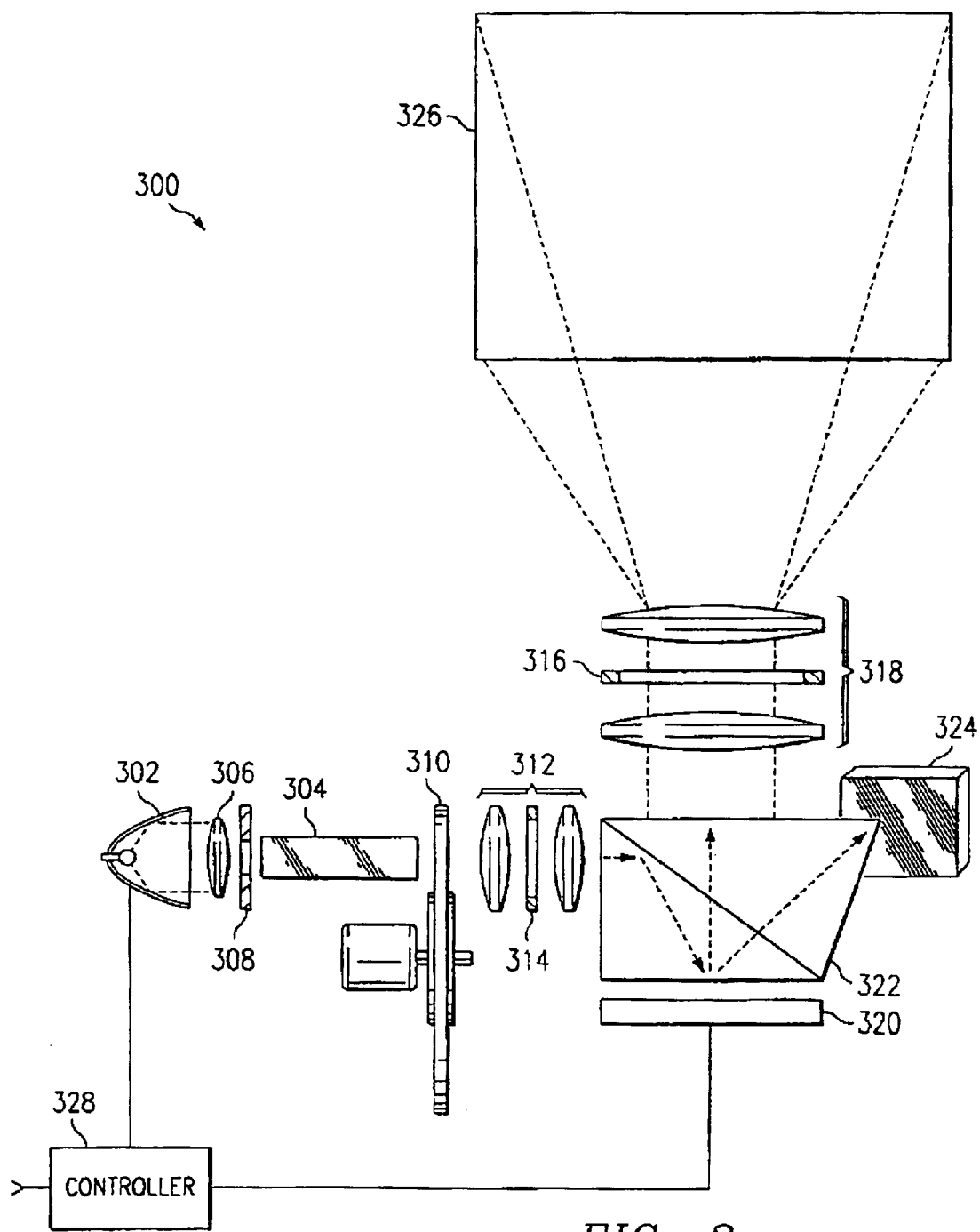
FIG. 3 is a schematic view of a micromirror-based projection system utilizing an improved micromirror device according to one embodiment of the present invention.

FIG. 3 illustrates the use of a TIR prism to provide a greater separation between the illumination and projection beams. FIG. 3 also illustrates the basic components used to form a micromirror based projection display system. In FIG. 3, light from light source 304 is focused on the entrance pupil of an integrating rod 304 by lens group 306. The entrance pupil of the integrating rod 304 is surrounded by a reflective aperture stop 308. Light striking the reflective aperture stop 308 is returned to the light source. The integrating rod 304 homogenizes the light passing through it. Light exiting the integrating rod 304 passes through a color wheel 310—which may be a scrolling color wheel or other type of recycling color wheel.

The light passing through the color wheel 310 is focused by lens group 312. Aperture stop 314 typically is located in lens group 312. Lens group 312 focuses the illumination light onto a spatial light modulator 320 through a TIR prism assembly 322. The off state light and the flat state light are directed to a light dump 324 which absorbs the light. Although the light dump 324 is shown attached to the TIR prism assembly, it could be a separate component, or the light may simply be allowed to exit the TIR prism and prevented from reaching the projection lens.

On state light exits the TIR prism assembly 322 and enters the projection lens 318. Another aperture stop 316 typically is used in the projection lens 318 to block a portion of the light, preventing it from passing through the lens to the image plane 322. Controller 328 provides image data and control signals to the spatial light modulator 320 to control the modulation of the illumination light in order to form an image on the image plane 326. Similar projection methods are used with color splitting prisms and three modulators in high brightness color projectors.

Figure 4:
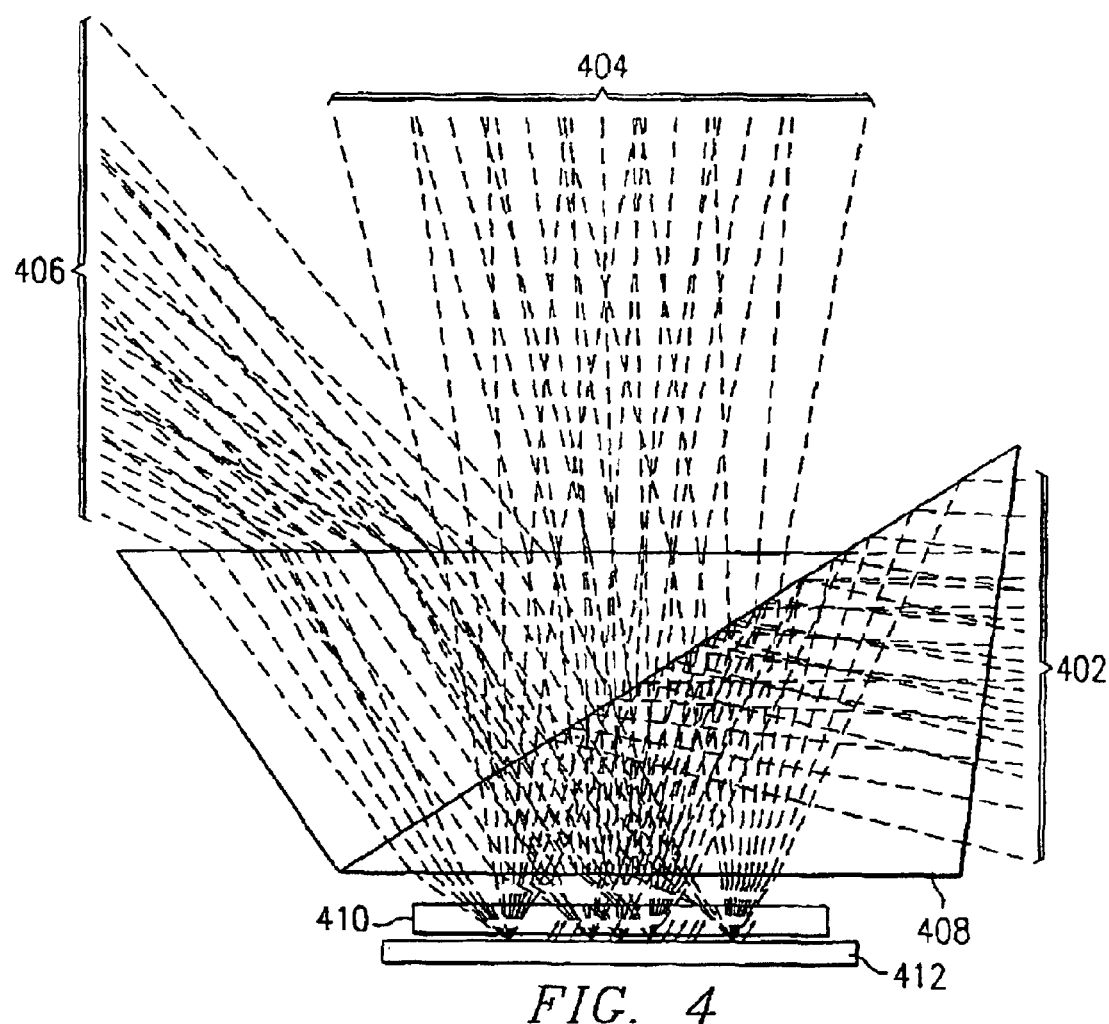
FIG. 4 is a side view of a TIR prism showing the overlap that occurs between the on state projection path and the flat state and off state light paths across an array of micromirrors.

While FIG. 3 shows only the chief ray passing through the TIR prism, in practice a rather large cone of rays passes through the TIR prism. FIG. 4 illustrates the path of the illumination bundle 402, the projection bundle 404 and the off state bundle 406 as then pass through a TIR prism assembly 408, a micromirror package window 410, and are reflected by the micromirror 412 back through the window and TIR prism assembly. By the time the off state and on state light bundles leave the TIR prism, there is considerable overlap between them. The overlap of the rays leaving the prism makes it difficult to capture the on state rays without also capturing the off state rays. Typically, the projection lens is moved away from the TIR prism to a point where the two bundles have separated. Moving the projection lens away from the TIR prism allows the ray bundle to increase in size and therefore increases the complexity and cost of the projection lens.

Figure 5:
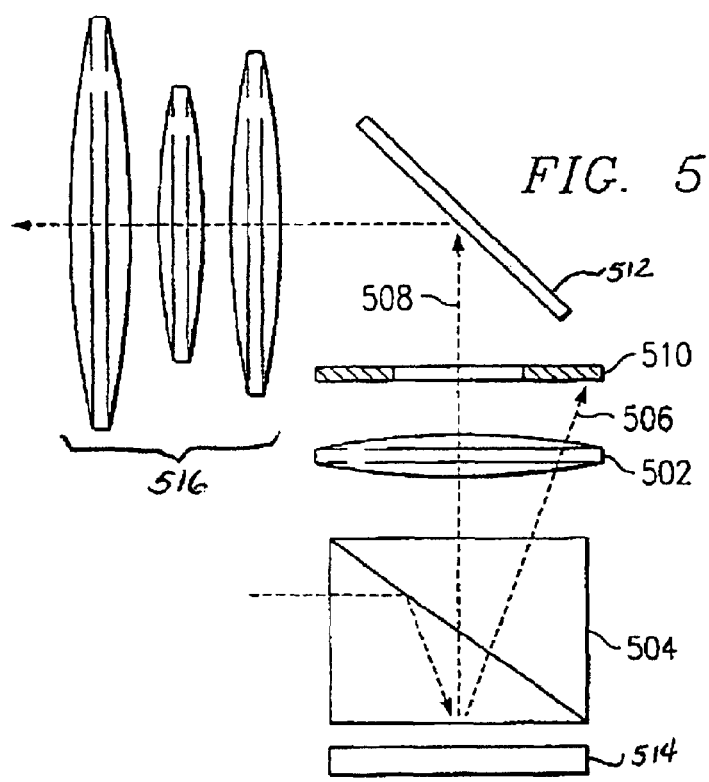
FIG. 5 is a schematic side view of the folded projection lens using an aperture stop and fold mirror according to one embodiment of the present invention.

An alternative to moving the projection lens away from the modulator array is shown in FIG. 5. In FIG. 5 a folded projection lens is used to enable a first lens element 502 to be placed very close to the TIR prism assembly 504. Off state light from the DMD 512 follows path 506 through the first lens element 502 while on state light follows path 508. An aperture stop 510 is positioned in the projection path to block some or all of the off state light. The on state light passes through the aperture stop 510 and reaches a fold mirror 512. The fold mirror 512 redirects the on state light to the remainder of the projection lens elements 516. Because the path is folded, the projection lens of FIG. 5 easily fits into a rear projection cabinet.

Figure 6:
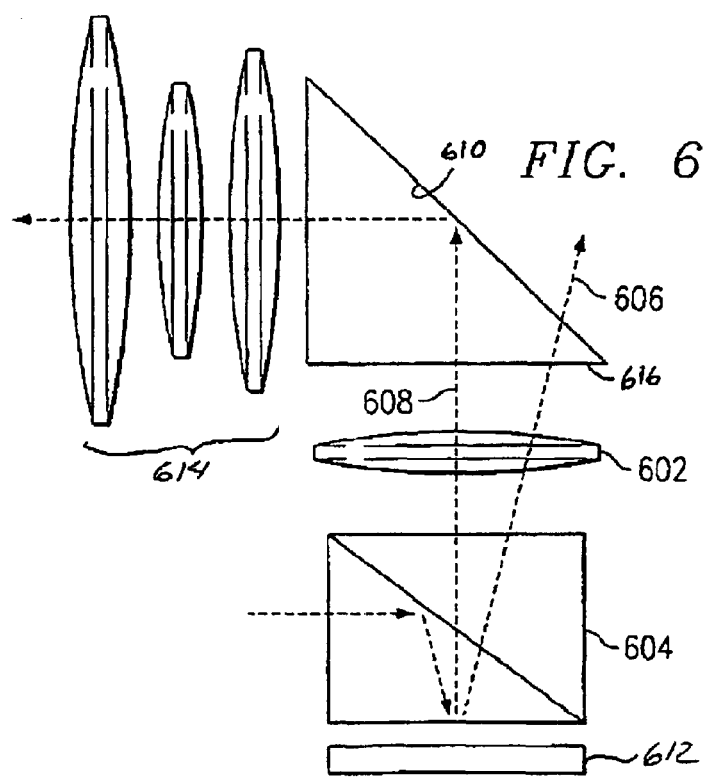
FIG. 6 is a schematic side view of the folded projection lens using a TIR prism as an angular filter and fold mirror according to another embodiment of the present invention.

FIG. 6 is a schematic side view of the folded projection lens which uses a TIR prism 616 as both an angular filter and fold mirror according to another embodiment of the present invention. In FIG. 6 a folded projection lens is used to enable a first lens element 602 to be placed very close to the TIR prism assembly 604. Off state light from the DMD 612 follows path 606 through the first lens element 602 while on state light follows path 608. A total internal reflection surface 610 receives both the on state and the off state light.

Because the off state light strikes the TIR surface 610 at an angle less than the Brewster's angle, the off state light passes through the TIR prism 616 and is removed from the projection path—reducing the black level of the image and increasing the contrast ratio. The on state light strikes the TIR surface 610 at an angle greater than Brewster's angle and is reflected by the TIR surface 610 through the remaining projection lens components 614. As with FIG. 5, an added benefit of using the TIR surface 610 as both an angular filter and a fold mirror is that a single component both improves the contrast ratio of the display and folds the lens to enable a smaller display system cabinet.

Thus, although there has been disclosed to this point a particular embodiment for a folded projection lens and display system, it is not intended that such specific references be considered as limitations upon the scope of this invention except insofar as set forth in the following claims. Furthermore, having described the invention in connection with certain specific embodiments thereof, it is to be understood that further modifications may now suggest themselves to those skilled in the art, it is intended to cover all such modifications as fall within the scope of the appended claims. In the following claims, only elements denoted by the words "means for" are intended to be interpreted as means plus function claims under 35 U.S.C. §112, paragraph six.

What is claimed is:

1. A projection lens comprising:
    a first lens element for receiving a beam of light traveling along a light path from a micromirror array;
    a total internal reflection surface positioned on said light path to receive light from said first lens and reflect on state light along a second path while not reflecting off state light along said second path;
    at least one additional lens on said second path operable to focus light traveling along said second path onto an image plane.

2. The projection lens of claim 1, said total internal reflection surface comprising a prism.

3. The projection lens of claim 1, said first lens positioned parallel to said micromirror array.

4. The projection lens of claim 1, said total internal reflection surface not reflecting flat state light along said second path.

5. A display system comprising:
    a light source for providing a light beam along an illumination path;
    a micromirror array on said illumination path, said micromirror operable to selectively reflect portions of said light beam along a projection path, said portions comprising on state reflections and off state reflections; and
    a projection lens system comprising:
        a first lens element for receiving said selectively reflected a beam of light traveling along said projection path;
        an aperture stop for blocking off state light passing through said first lens;
        a total internal reflection surface positioned on said light path to receive light from said first lens and reflect on state light along a second path while not reflecting off state light along said second path; and
        at least one additional lens on said second path operable to focus light traveling along said second path onto an image plane.

6. The display system of claim 5, said total internal reflection surface comprising a prism.

7. The display system of claim 5, said first lens positioned parallel to said micromirror array.

8. The display system of claim 5, said total internal reflection surface not reflecting flat state light along said second path.

* * * * *